US010728392B1

(12) United States Patent
Chandrakant et al.

(10) Patent No.: US 10,728,392 B1
(45) Date of Patent: Jul. 28, 2020

(54) METHOD AND SYSTEM FOR MANAGING AVAILABILITY STATES OF A USER TO COMMUNICATE OVER MULTIPLE COMMUNICATION PLATFORMS

(71) Applicant: NICE LTD, Ra'anana (IL)

(72) Inventors: Deshmukh Tushar Chandrakant, Pune (IN); Ashish Seth, Los Altos, CA (US); Sebastien Roland Mancel, Danville, CA (US); Pathak Amar Sureshrao, Pune (IN); Dipjyoti Saikia, Pune (IN); Joglekar Omkar Shrihari, Pune (IN); Mirasdar Anand Vasudeo, Pune (IN)

(73) Assignee: INCONTACT INC., Sandy, UT (US)

( * ) Notice: Subject to any disclaimer, the term of this patent is extended or adjusted under 35 U.S.C. 154(b) by 0 days.

(21) Appl. No.: 16/358,725

(22) Filed: Mar. 20, 2019

(51) Int. Cl.
*H04M 3/523* (2006.01)
*H04M 3/51* (2006.01)
*H04L 29/08* (2006.01)

(52) U.S. Cl.
CPC .......... *H04M 3/5232* (2013.01); *H04L 67/24* (2013.01); *H04M 3/5183* (2013.01); *H04M 3/5237* (2013.01)

(58) Field of Classification Search
None
See application file for complete search history.

(56) References Cited

U.S. PATENT DOCUMENTS 5,826,030 A 10/1998 Hebert
7,231,034 B1 * 6/2007 Rikhy ................. H04M 3/5233
379/265.09
8,839,270 B2 9/2014 Chen
9,774,741 B1 9/2017 Jayapalan et al.
2002/0055967 A1 5/2002 Coussement
2004/0228469 A1 11/2004 Andrews et al.
(Continued)

FOREIGN PATENT DOCUMENTS

EP 2134067 A1 12/2009

OTHER PUBLICATIONS https://www.genesys.com/definitions/what-is-an-omnichannel-cloud-call-center.

*Primary Examiner* — Antim G Shah
(74) *Attorney, Agent, or Firm* — Soroker Agmon Nordman

(57) ABSTRACT

A computerized method for managing availability states of a user to communicate over multiple communication platforms may include a processor of a computerized system communicating with at least two communication platforms. The processor may be configured to detect a change in an availability state of a user to communicate over a first communication platform from the at least two communication platforms, upon detecting the change, to map availability states of the user to other communication platforms in the at least two communication platforms using a set of mapping rules indicating whether the user is available to manage communications over the other communication platforms, to synchronize the mapped availability states of the user with the other communication platforms, and to rerouting incoming communications to any of the other communication platforms to another user if the user is unavailable to manage the incoming communications based on the synchronized availability states.

23 Claims, 11 Drawing Sheets

(56) References Cited

U.S. PATENT DOCUMENTS

| | | | |
|---|---|---|---|
| 2006/0029206 A1* | 2/2006 | Anisimov | H04M 3/5183 379/265.03 |
| 2006/0093125 A1 | 5/2006 | Dezonno | |
| 2009/0122973 A1* | 5/2009 | Jay | H04M 3/5125 379/266.01 |
| 2011/0026517 A1* | 2/2011 | Capuozzo | H04M 7/0012 370/352 |
| 2012/0233307 A1 | 9/2012 | Soundrapandian | |
| 2014/0344385 A1* | 11/2014 | Odell | G06Q 10/107 709/206 |
| 2015/0016600 A1* | 1/2015 | Desai | H04M 3/5232 379/266.07 |
| 2017/0331829 A1* | 11/2017 | Lander | G06F 21/6218 |
| 2018/0375992 A1* | 12/2018 | Zaghdoud | H04M 3/4211 |

* cited by examiner

METHOD AND SYSTEM FOR MANAGING AVAILABILITY STATES OF A USER TO COMMUNICATE OVER MULTIPLE COMMUNICATION PLATFORMS

FIELD OF THE INVENTION

The present invention relates to communication systems, and particularly to a method and system for managing availability states of a user to communicate over multiple communication platforms.

BACKGROUND OF THE INVENTION

A company may use customer contact or call centers to provide customer service for their products and/or services. The contact center system may use multiple communication systems such as Unified Communication as a Service (UCaaS) and an Automatic Call Distribution (ACD) system, for example. An automatic call distributor in ACD systems is a telephony device that distributes incoming call center calls to a group of agents within an organization. Similarly, (UCaaS) is cloud delivery mechanism for enterprise communications. The desktop or workstation of each call center agent may include multiple monitors, displays, telephones, or communication devices connected to these multiple communication systems for communicating with the agent at a single desktop, for example.

When the agent may be on a UCaaS-based customer call, the agent may not be able to answer an incoming call over the ACD system, and vice versa. Suppose, for example, an agent for a medical company has two telephones on his desktop: one from a platform using ACD and another from a UCaaS platform. The agent is on a call over the UCaaS platform when there is an incoming emergency call over the ACD platform. Since the agent is on the first call, he will not answer the second emergency call. If the two systems were synchronized regarding the unavailable status of the agent, the second call would be routed to a second agent.

Thus, there may be a need in the art for a method and system for detecting the agent availability status and synchronizing that status of the agent between multiple communication systems so as to reduce inconsistent workflows, operational disruption or a bad user experience.

SUMMARY OF THE INVENTION

There is thus provided, in accordance with some embodiments of the present invention, a computerized method for managing availability states of a user to communicate over multiple communication platforms may include a processor of a computerized system communicating with at least two communication platforms respectively operating on at least two communication systems. The processor may be configured to execute a code with instructions for:

detecting a change in an availability state of a user to communicate over a first communication platform from the at least two communication platforms;

upon detecting the change, mapping availability states of the user to other communication platforms in the at least two communication platforms using a set of mapping rules indicating whether the user is available to manage communications over the other communication platforms;

synchronizing the mapped availability states of the user with the other communication platforms in the at least two communication platforms; and rerouting incoming communications over any of the other communication platforms to another user if the user is unavailable to manage the incoming communications based on the synchronized availability states.

Furthermore, in accordance with some embodiments of the present disclosure, at least one rule in the set of mapping rules may include a next availability state, and the method may include automatically applying the at least one rule with the next availability state to the at least two communication platforms.

Furthermore, in accordance with some embodiments of the present disclosure, detecting the change may include receiving or ending a communication by the user on the first communication platform.

Furthermore, in accordance with some embodiments of the present disclosure, detecting the change may include changing the availability state to available or unavailable by the user on the first communication platform.

Furthermore, in accordance with some embodiments of the present disclosure, the method may include outputting the mapping of the availability states on a display.

Furthermore, in accordance with some embodiments of the present disclosure, the at least two communication platforms may include an automatic call distribution (ACD) platform and a Unified Communication as a Service (UCaaS).

Furthermore, in accordance with some embodiments of the present disclosure, the availability states may be selected from the group consisting of offline, unavailable, unavailable meeting, unavailable lunch, busy, after call work (ACW), out of office, working, away, do not disturb (DND), messages only, available, and online.

Furthermore, in accordance with some embodiments of the present disclosure, the set of mapping rules may include rules for routing communications to other users or to communication platforms used by the other users.

Furthermore, in accordance with some embodiments of the present disclosure, the set of mapping rules may be specific to the user, a group of users, or the at least two communication systems.

Furthermore, in accordance with some embodiments of the present disclosure, the method may include receiving the set of mapping rules created by the user.

Furthermore, in accordance with some embodiments of the present disclosure, the method may include creating the set of mapping rules dynamically.

There is further provided, in accordance with some embodiments of the present invention, a computerized system for managing availability states of a user to communicate over multiple communication platforms may include a communication interface and a processor. The processor may communicate via the communication interface with at least two communication platforms respectively over at least two communication systems, and may be configured to execute a code with instructions for:

detecting a change in an availability state of a user to communicate over a first communication platform from the at least two communication platforms;

upon detecting the change, mapping availability states of the user to other communication platforms in the at least two communication platforms using a set of mapping rules indicating whether the user is available to manage communications over the other communication platforms;

synchronizing the mapped availability states of the user with the other communication platforms in the at least two communication platforms; and rerouting incoming communications over any of the other communication platforms to another user if the user is unavailable to manage the incoming communications based on the synchronized availability states.

Furthermore, in accordance with some embodiments of the present disclosure, at least one rule in the set of mapping rules may include a next availability state, and the processor may be configured to execute a code with instructions for automatically applying the at least one rule with the next availability state to the at least two communication platforms.

Furthermore, in accordance with some embodiments of the present disclosure, the processor may be configured to execute a code with instructions for detecting the change by receiving or ending a communication by the user on the first communication platform.

Furthermore, in accordance with some embodiments of the present disclosure, the processor may be configured to execute a code with instructions for detecting the change by the user changing the availability state to available or unavailable on the first communication platform.

Furthermore, in accordance with some embodiments of the present disclosure, the system may include a display, and the processor may be configured to execute a code with instructions for outputting the mapping of the availability states on the display.

Furthermore, in accordance with some embodiments of the present disclosure, the at least two communication platforms may include an automatic call distribution (ACD) platform and a Unified Communication as a Service (UCaaS).

Furthermore, in accordance with some embodiments of the present disclosure, the availability states may be selected from the group consisting of offline, unavailable, unavailable meeting, unavailable lunch, busy, after call work (ACW), out of office, working, away, do not disturb (DND), messages only, available, and online.

Furthermore, in accordance with some embodiments of the present disclosure, the set of mapping rules may include rules for routing communications to other users or to communication platforms used by the other users.

Furthermore, in accordance with some embodiments of the present disclosure, the set of mapping rules may be specific to the user, a group of users, or the at least two communication systems.

Furthermore, in accordance with some embodiments of the present disclosure, the processor may be configured to execute a code with instructions for receiving the set of mapping rules created by the user.

Furthermore, in accordance with some embodiments of the present disclosure, the processor may be configured to execute a code with instructions for creating the set of mapping rules dynamically.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
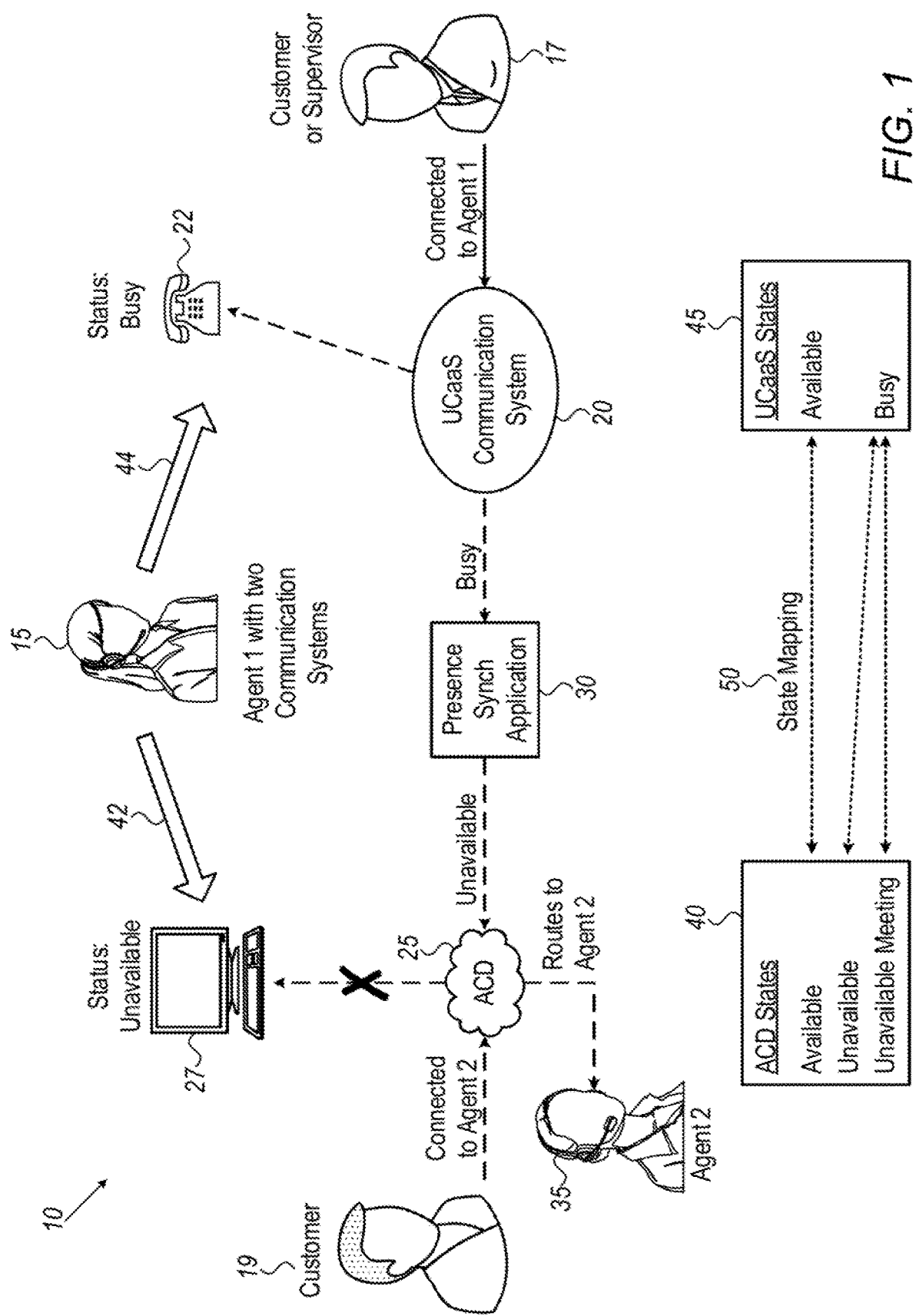
FIG. 1 schematically illustrates a system where an agent may communicate over two communication systems, in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Embodiments of the present invention herein describe a system and method for managing availability states of a user to communicate over multiple communication platforms over respective multiple communication systems. In some embodiments, the user may be an agent of a call center interacting with customers over multiple communication platforms. A computerized system, for example, may monitor communications over each of the multiple communication platforms. When the user answers an incoming communication over a first communication platform from the multiple communication platforms and is no longer available, the computerized system may synchronize the status of user as being not available over each the other computerized platforms. Once the other computerized platforms received a "not available" notification regarding the user, the other computerized systems may be configured to reroute calls to other available users.

In the context of the present disclosure, a communication platform may refer to communication devices such as a computer, laptop, tablet, telephone, cellular phone, smart phone, video call device, and the like. A communication platform may refer to any communication application running on these devices. Furthermore, the communication platform may provide communication between the user and any other person. For example, the user may see and/or speak to another person by video via a communication application running on any of the communication devices listed herein above.

FIG. 1 schematically illustrates a system 10 where an agent 15 may communicate over two communication systems, in accordance with some embodiments of the present invention. An agent 15 of a call center may be communicating 44 with a customer or supervisor 19 via a telephone 22 (e.g., a telephony platform) communicating over an UCaaS communication system 20. Similarly, the agent may also communicate over a computer 27 (e.g., a computer platform). In some embodiments, computer 27 may include a communication software such as an Automatic Call Distribution (ACD) software for providing communication 42 between the agent and a second party such as a customer or supervisor, for example, over an ACD system 25. Computer 27 may be located at the agent's desktop or workstation or placed in any suitable location.

In some embodiments of the present invention, a presence synchronization application (PSA) 30 running, for example, on a computerized system such as a server (not shown) may monitor the communications over ACD 25 and UCaaS communication system 20. While agent 15 is talking to customer or supervisor 17 over telephone 22, PSA 30 may detect that UCaaS communication system 20 connected to agent 15 is busy. In response, PSA 30 may use a set of state mapping rules 50 for mapping the availability states of the user (e.g., agent 15) between UCaaS States 45 (e.g., busy or available) to ACD states 40 (e.g., available, unavailable, or unavailable—in meeting).

The terms state, availability state and/or routing state may be used interchangeably herein. Although availability states may refer to whether one agent or any number of agents are able to manage a communication on a given communication platform, the availability states may also refer to whether communications may be routed to a particular agent or a communication platform. The set of mapping rules may be used by the multiple communication platforms (e.g., ACD or UCaaS) to map and/or translate and/or transform the availability state of a user communicating over a given communication platform to another communication platform using the mapping rules. The mapping rules may include routing states for routing incoming and/or outgoing communications between the multiple communication platforms and/or between multiple agents or users.

For example, when agent 15 speaks to customer or supervisor 17 on telephone 22, the UCaaS state 45 of agent 15 is Busy. State mapping rules 50 map UCaaS state 45 as "Busy" to ACD state 40 as "unavailable". PSA 30 may publish the "unavailable" state of agent 15 to ACD 25. Thus, if another customer, such as a customer 19 tries to call the call center via ACD System 25, ACD 25 now identifies that agent 15 is unavailable and may route that call to a second agent 35. In this manner, first agent 15 will not receive an incoming communication (e.g., incoming call) over communication platform 27.

Figure 2:
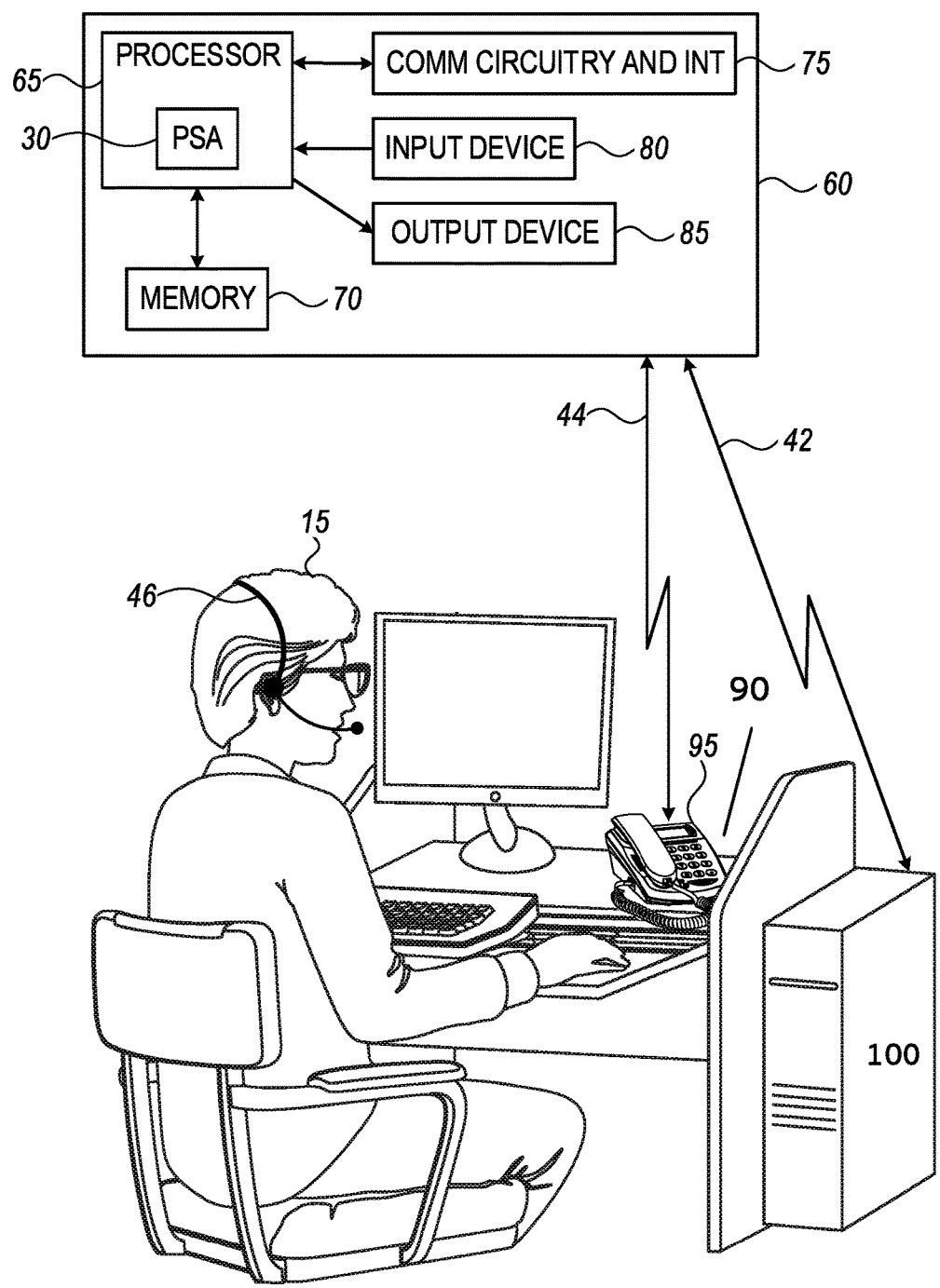
FIG. 2 schematically illustrates a block diagram of a computerized system for managing availability states of a user to communicate over multiple communication platforms, in accordance with some embodiments of the present invention.

FIG. 2 schematically illustrates a block diagram of a computerized system 60 for managing availability states of a user to communicate over multiple communication platforms, in accordance with some embodiments of the present invention. Computerized system 60 may include a processor 65 coupled to a memory 70, a communication circuitry module and interface 75, an input device 80 and an output device 85. PSA may communicate 44 with a telephone 95 over the UCaaS system or communicate 42 with a computer 100 over the ACD system. In some embodiments, telephone 95 and computer 100 may be located on a same desktop 90 for agent 15 to use to communicate with any other parties.

In some embodiments of the present invention, computerized system 60 may be computer 27 on which PSA 30 may be operating, or a server communicating with both UCaaS Communication System 20 and ACD 25, or with any other communication platform over any suitable communication system.

Processor 65 may include one or more processing units, e.g. of one or more computers. Processor 65 may be configured to operate in accordance with programmed instructions stored in memory 70. Processor 65 may be capable of executing code for executing presence synchronization application (PSA) 30.

Processor 65 may communicate with output device 85. For example, output device 85 may include a computer monitor or screen. Processor 65 may communicate with a screen of output device 85 to display the mapping of the availability state of the user to communicate over the two communication platforms. In another example, output device 85 may include a printer, display panel, speaker, or another device capable of producing visible, audible, or tactile output.

Processor 65 may communicate with input device 80. For example, input device 80 may include one or more of a keyboard, keypad, or pointing device for enabling a user to inputting data or instructions for operation of processor 65.

Processor 65 may communicate with memory 70. Memory 70 may include one or more volatile or nonvolatile memory devices. Memory 70 may be utilized to store, for example, programmed instructions for operation of processor 65, data or parameters for use by processor 65 during operation, or results of operation of processor 65.

In some embodiments, input device 80 and/or output device 85 may be incorporated in a headset 46 of agent 15 for communicating with parties.

In operation, processor 65 may execute a method for managing availability states of a user to communicate over multiple communication platforms.

In some embodiments, each of the computerized platforms may include a processor, memory, input and output devices as well as communication circuitry. The embodiments shown in FIG. 2 are by way of example and not by way of limitation of the embodiments of the present invention. PSA 30 is not limited to a computerized system such as a server, but may operate on any suitable computer platform communicating and operating over the multiple communication systems.

In some embodiments of the present invention, PSA 30 may gather a list of possible availability states from at least two communication platforms respectively operating over at least two communication systems. In the embodiment shown in FIGS. 1 and 2, there are two communication platforms. The first platform may be computer 100 communicating via an ACD communication system where user 15 communicates with parties via an ACD application running on computer 100. The second platform may be telephone 95 operating over UCaaS communication system.

In some embodiments of the present invention, PSA 30 may allow user 15 to create his/her own mapping rules of the available states on each of the least two communication platforms. Availability state mapping may include one or many rules. PSA 30 may create the rules dynamically without modification in any of the at least two communication systems. The rules may be specific to agent 15, specific to the communication channel (ACD or UCaaS), or specific to a group of agents. The rules may include routing information between communication platforms and/or groups of users.

When the availability state of the agent changes on a first communication system from the at least two communication systems, the availability state change may be communicated to PSA 30. PSA 30 may apply the mapping rules to determine the corresponding availability state of the agent on the other communication systems from the at least two communication systems. Upon detecting the availability state change of the agent on the first communication system, PSA 30 may then relay or publish the mapped availability states of the agent to each of the platforms of the other communication systems. Each communication platform may apply the mapped availability states regarding the agent.

In some embodiments of the present invention, PSA 30 may be configured to map and to handle special cases where the agent availability state on one system may be set as "Do Not Disturb" (DND) or "After Call Work" (ACW), and the agent's availability state may be then be relayed or published and mapped as "unavailable" to all of the other communication systems. For example, agent 30 may set his availability such as manually, for example, to DND or ACW over the first communication system which may be relayed to PSA 30. PSA 30 may map and publish this availability state to each of the other communication platforms operating over the other communication systems. In case of ACW or DND. PSA 30 may be allowed to set the availability state over each of the other communication platforms operating over the other communication systems when the availability states of the agents change from available or unavailable.

In some embodiments of the present invention, at least one mapping rule in the set of mapping rules may include a rule for a next availability state. For example, in the case where there is an incoming communication to the agent over one of the communication platforms, such as ACD or UCaaS platforms, for example, once the agent finishes the communication with a customer at least one rule in the set of rules may be configured to identify that upon ending the communication, the agent may need to perform after call work (ACW) for a predefined period of time (e.g., 1-10 minutes, for example). In this case, the agent will be unavailable to receive incoming communications of any of the communication platforms.

In some embodiments of the present invention, computerized system 60 may automatically send and/or apply the next state defined in the at least one rule to each of the communication platforms for flagging the agent as unavailable to manage any new incoming communications (e.g., telephone calls, e-mails, video calls) from another customer, for example, so as to give the agent time to complete tasks and work related to the previous customer call. In response, each of the communication platforms may reroute any incoming communications to another agent that is available to manage the communication from a customer, for example.

Figure 3:
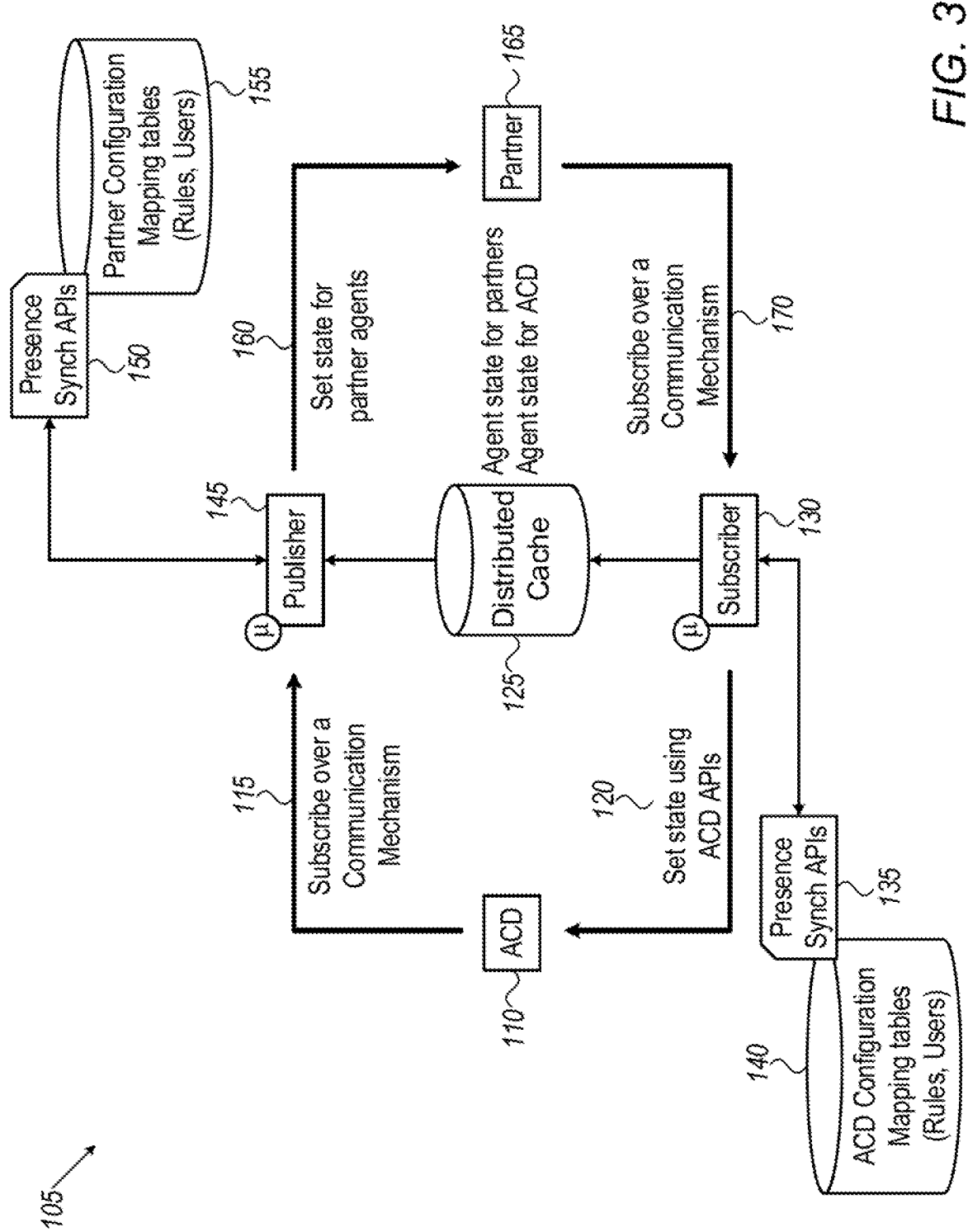
FIG. 3 schematically illustrates an architectural flow diagram of a presence synchronization application (PSA) for managing availability states of a user to communicate over multiple communication platforms, in accordance with some embodiments of the present invention.

FIG. 3 schematically illustrates an architectural flow diagram 105 of presence synchronization application (PSA) 30 for managing availability states of a user to communicate over multiple communication platforms, in accordance with some embodiments of the present invention. In flow diagram 105, PSA 30 synchronizes the availability states of the user to manage incoming communications between an ACD 110 communication platform and a partner 165 communication platform, such as a UCaaS platform. Partner 165 is not limited to a UCaaS platform, but may refer to any suitable communication platform.

In some embodiments of the present invention, flow diagram 105 depicts two independent micro-services: Publisher 145 and Subscriber 130. A distributed cache 125 may store the agent availability states for partner communication platform 165 and for ACD 110.

Publisher 145 may be an abstraction for a service which receives events from ACD 110. ACD 110 may subscribe 115 over a communication mechanism, such as Amazon Kinesis or Web sockets, for example, to send events to Publisher 145. Publisher 145 may call presence synchronization application programming interfaces (API) 150 with partner configuration mapping tables 155 with rules for different users, so as to set 160 the states (e.g., availability states) for partner agents in partner communication platform 165.

Similarly, Subscriber 130 may be an abstraction for a service which receives events from Partner 165. Partner 165 may subscribe 170 over a communication mechanism, such as Amazon Kinesis or Web sockets, for example, to send events to Subscriber 130. Subscriber 130 may call presence synchronization application programming interfaces (API) 135 with ACD configuration mapping tables 140 with rules for different users, so as to set 120 the states (e.g., availability states) using ACD APIs in ACD 110.

In some embodiments of the present invention, Subscriber 130 may include additional business logic to validate if ACD agent is available to manage a call or communication before setting the agent state on ACD 110.

In some embodiments of the present invention, PCA 30 may include a user interface for administrators to perform the following functions for: (1) mapping ACD agents to UCaaS agents, (2) mapping ACD unavailable codes to UCaaS unavailable codes (e.g., availability state mapping), (3) configuring business rules to set the current state or the next state for the agent, (4) configuring rules uni-directionally or bi-directionally between ACD 110 and Partner 165, and (5) configuring an application programming interface (API) for partner-specific end points and a subscription mechanism.

Figure 4:
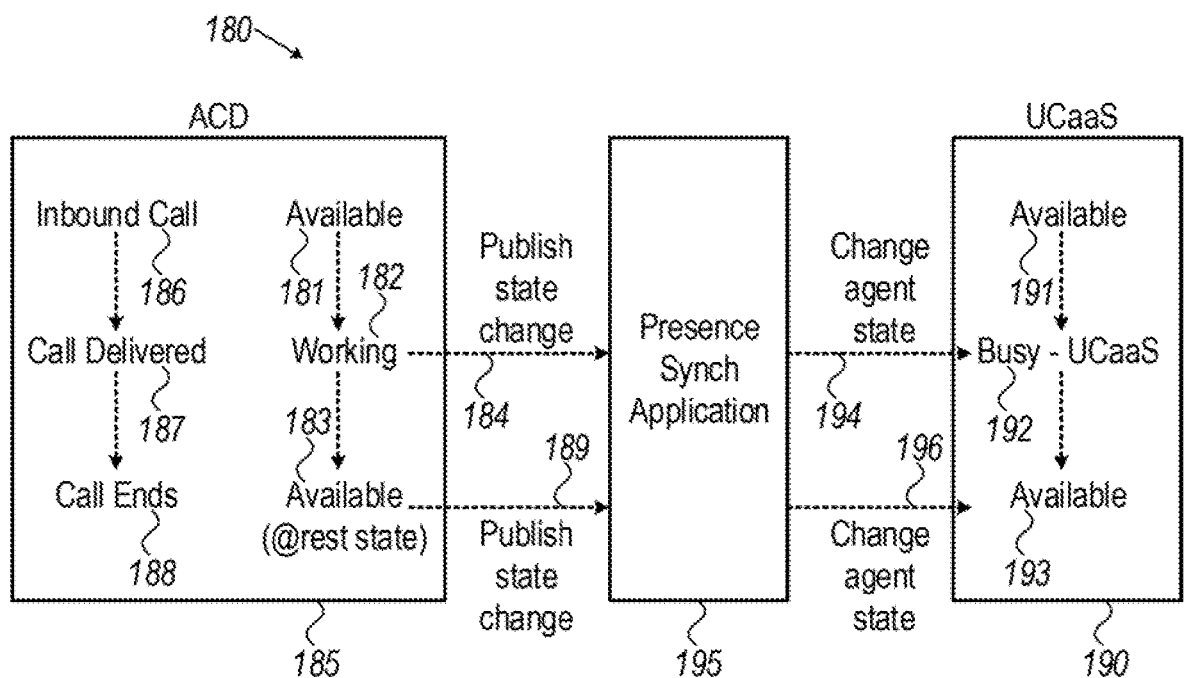
FIG. 4 is a flow diagram for publishing agent availability state changes from an ACD communication platform to a UCaaS communication platform, in accordance with some embodiments of the present invention.

FIG. 4 is a flow diagram 180 for publishing agent availability state changes from an ACD communication platform 185 to a UCaaS communication platform 190, in accordance with some embodiments of the present invention. Agent 15 may answer an inbound call 186 on ACD 185 (e.g., call delivered 187 to agent 15). This change in state may be published 184 and detected by a PSA 195. The availability state of agent 15 may be set from available 181 to working 182. Publisher 145 microservice in PSA 195 may consume messages published by ACD 185 platform. PSA 195 may act as an intermediary to transform ACD events to a partner specific format (e.g., UCaaS format). PSA 195 may map the change in availability state using a set of mapping rules. PSA 195 may apply the mapped rules in UCaaS 190 which changes 194 the agent state in UCaaS 190 from Available 191 to Busy 192.

Similarly, ACD 185 may publish 189 when the call ends 188. PSA 195 may detect the state change of agent 15 from published state change 189 and change the availability state of agent 15 to available 183 on ACD 185. Similarly, PSA 195 maps the available state to ACD 185 to available on UCaaS 190 and changes agent state 196 from busy 192 to an available 193 state on UCaaS platform 190 based on the mapping rules.

Figure 5:
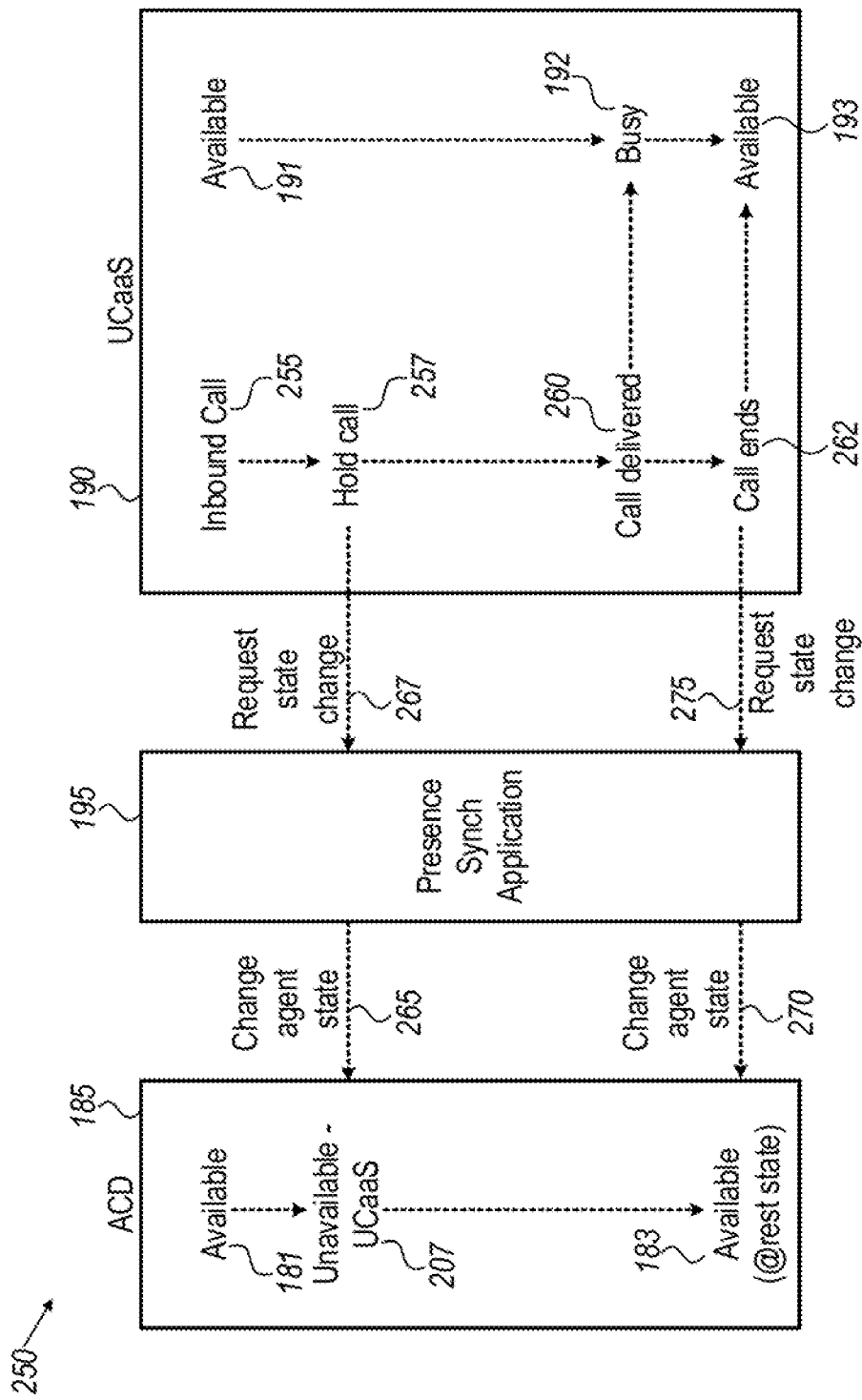
FIG. 5 is a flow diagram for publishing agent availability state changes from a UCaaS communication platform to an ACD communication platform, in accordance with some embodiments of the present invention.

FIG. 5 is a flow diagram 250 for publishing agent availability state changes from UCaaS communication platform 190 to ACD communication platform 185, in accordance with some embodiments of the present invention. Agent 15 may receive an inbound call 255 on UCaaS 190. UCaaS may hold call 257 and PSA 195 identifies a request a state change 267. PSA 195 may map the event to a change agent state 265 on ACD 185. While in this state, any communications to agent 15 on ACD 185 may be blocked or rerouted calls. When the call is delivered 260 on UCaaS, the availability state on UCaaS is changed from Available 191 to Busy 192.

When the call ends 262 on UCaaS, the availability state of the agent is Available 193. PSA 195 may receive a request state change 275. PSA 195 may map the available state of agent 15 on UCaaS 190 to available 183 on ACD 185 upon sending a change agent state 270 to ACD 185 which may allow for ACD 185 to receive communications. In some embodiments, PSA 195 may first check if agent 15 is available for a call of ACD 185 before sending change agent state 270 to ACD 185. If not, the incoming call to ACD 185 may be parked.

In the embodiment shown in FIG. 5, Subscriber 130 microservice in PSA 195 may consume messages published by UCaaS 190 platform. PSA 195 may act as an intermediary for transforming Partner specific events (e.g., UCaaS events in the embodiments of FIG. 5) to an ACD format.

Figure 6:
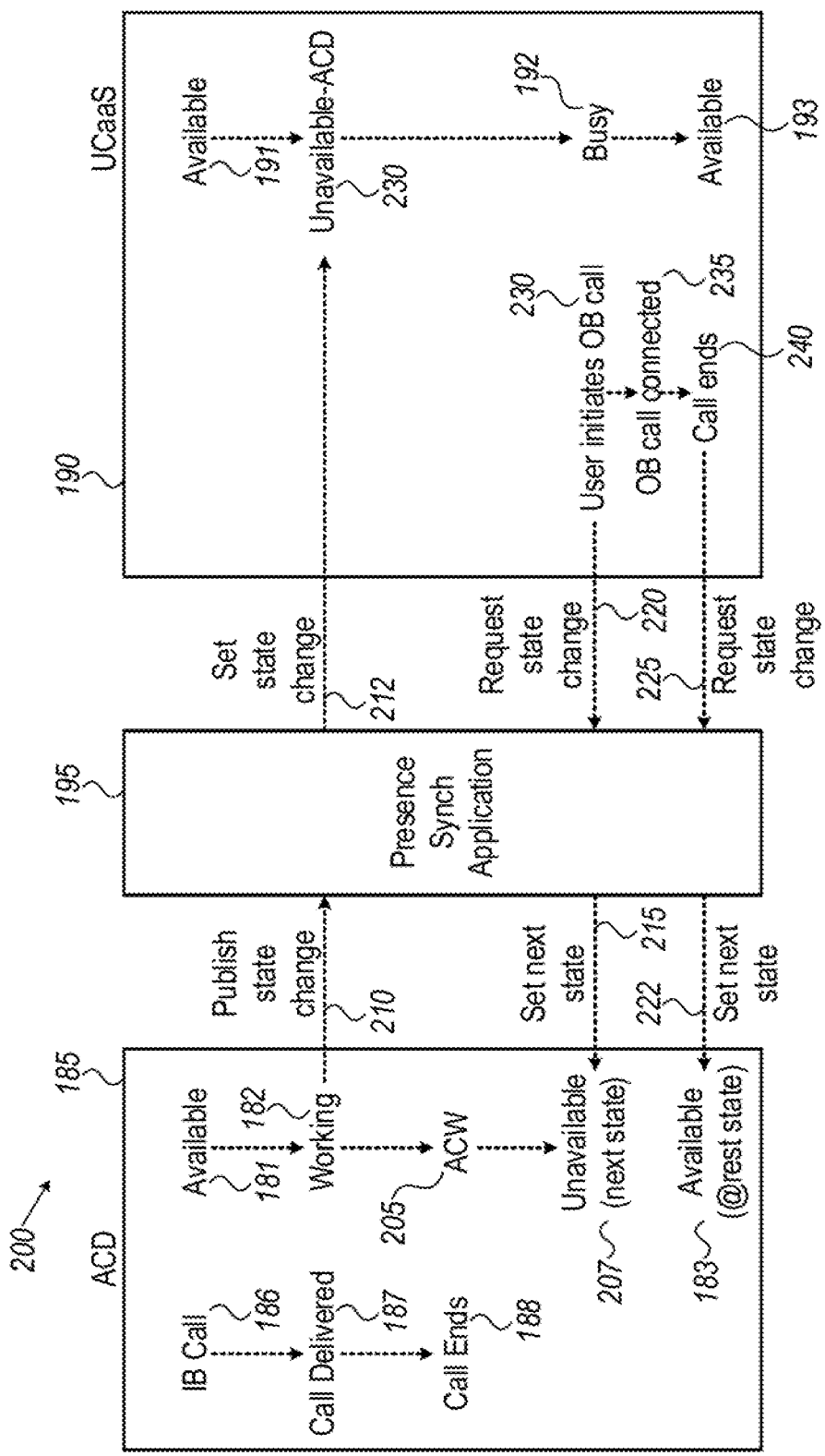
FIG. 6 is a flow diagram for managing outbound calls during an after-call work (ACW) flow, in accordance with some embodiments of the present invention.

FIG. 6 is a flow diagram 250 for managing outbound calls during an after-call work (ACW) flow, in accordance with some embodiments of the present invention. The example process flow shown in FIG. 6 describes a use case with multiple state changes where initially the agent may receive in incoming or inbound (IB) communication such as a call over ACD 185 platform as shown similarly in FIG. 4. IB call 186 may be delivered 187 to agent 15 and ACD 15 publishes 210 a state change. PSA 195 detects the state change and maps the agent state to UCaaS 190 by setting 212 state change from available 191 to unavailable 230 on UCaaS 190 platform.

In some embodiments of the present invention, the agent call ends 188 on ACD 185, at least one of the mapping rules in the set of mapping rules may include an option for automatically triggering or applying a next availability state. In this example, upon ending the communication (e.g., hanging up the call), PSA 195 may map the availability state of the agent on ACD 185 to after call work (ACW) 205. In this case, the agent state on ACD 185 remains unavailable to allow the agent to perform after call work on the previous call. In some embodiments, the availability state of the agent may remain in ACW 205 for a predefined period of time before the availability state returns automatically to an availability state of available.

However, in the example embodiment shown in FIG. 6, while the availability state of the agent on ACD 185 is ACW 205, the user (agent) initiates 230 an outbound (OB) call on UCaaS 190 platform. PSA 195 receives a change state request 220 and PSA 195 may set next state 215 to ACD 185. The availability state on ACD 185 changes from ACW 205 to unavailable 207. OB call connects 235. When the call ends 240, PSA 195 receives a change state request 225 and PSA 195 may set next state 222 to ACD 185. The availability state on ACD 185 changes from unavailable 207 to available 183.

In some embodiments of the present invention, variations of the publisher flow shown in architectural flow diagram 105 as applied to the embodiments of FIG. 6 may include handling outbound calls initiated the agent while working, for example, on ACW notes. Publisher 145 may use next state APIs to queue a future or a next state for the agent after completion of the current activity (e.g., ACW 205).

Figure 7:
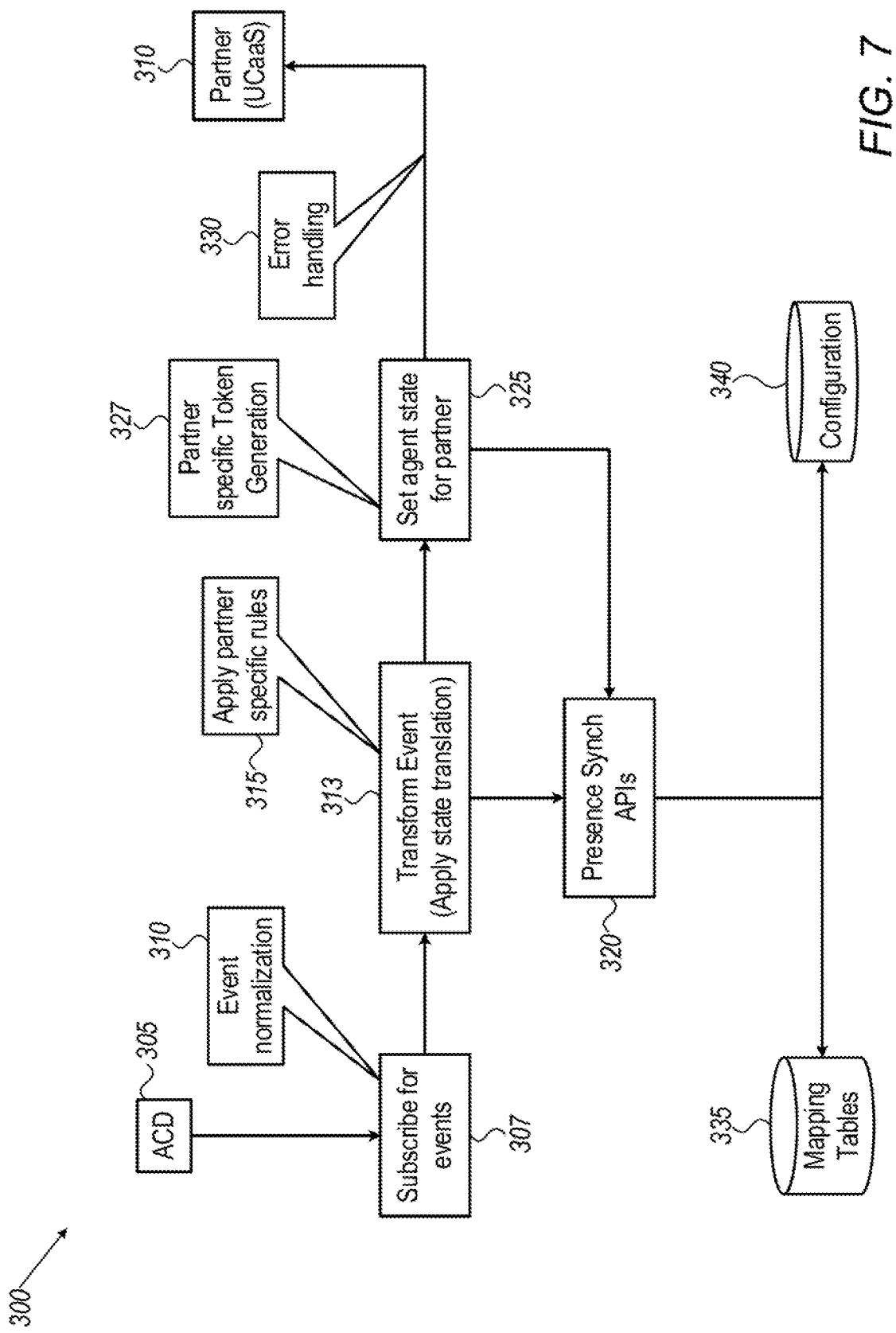
FIG. 7 is an algorithmic flow diagram for a publisher microservice, in accordance with some embodiments of the present invention.

FIG. 7 is an algorithmic flow diagram 300 for publisher 145 microservice, in accordance with some embodiments of the present invention. Publisher 145 may subscribe for events 307 from an ACD 305 platform with event normalization 310. The events may be transformed 313 by applying state translation by applying 315 partner (e.g., UCaaS) specific rules. Publisher 145 may set agent states 325 for Partner (UCaaS) communication platform 310 applying error handling 330. Publisher 145 may call Presence Synchronization APIs 320 which uses mapping tables 335 and configuration 340 with partner specific configuration. Mapping tables 335 may include, for example, state synchronization rules, user mappings, association of rules with partners, and flow of events.

In some embodiments of the present invention, Publisher 145 may receive a stream of events from ACD 305. Instructions for processing the stream of events are listed below:

1. Publisher 145 may process events of a specific type that indicate a change in agent state. Publisher 145 may ignore all other events sent by ACD 305.

2. Agent, business unit ID (BUID) and partner details may be derived from the events.

3. Partner specific subscription may be validated for directionality from ACD 305 to UCaaS 310.

4. Agent specific details may be fetched from the mapping table to get state synchronization rules and partner identity.

5. State synchronization rules may be applied to transform agent state in a format compatible with partner communication platform 310.

6. Token management may look up tokens specific to partner and BUID. The same token may be used to set agent state on partner side using APIs.

7. If agent state is not set in the first attempt, publisher 145 may attempt retries as configured.

Figure 8:
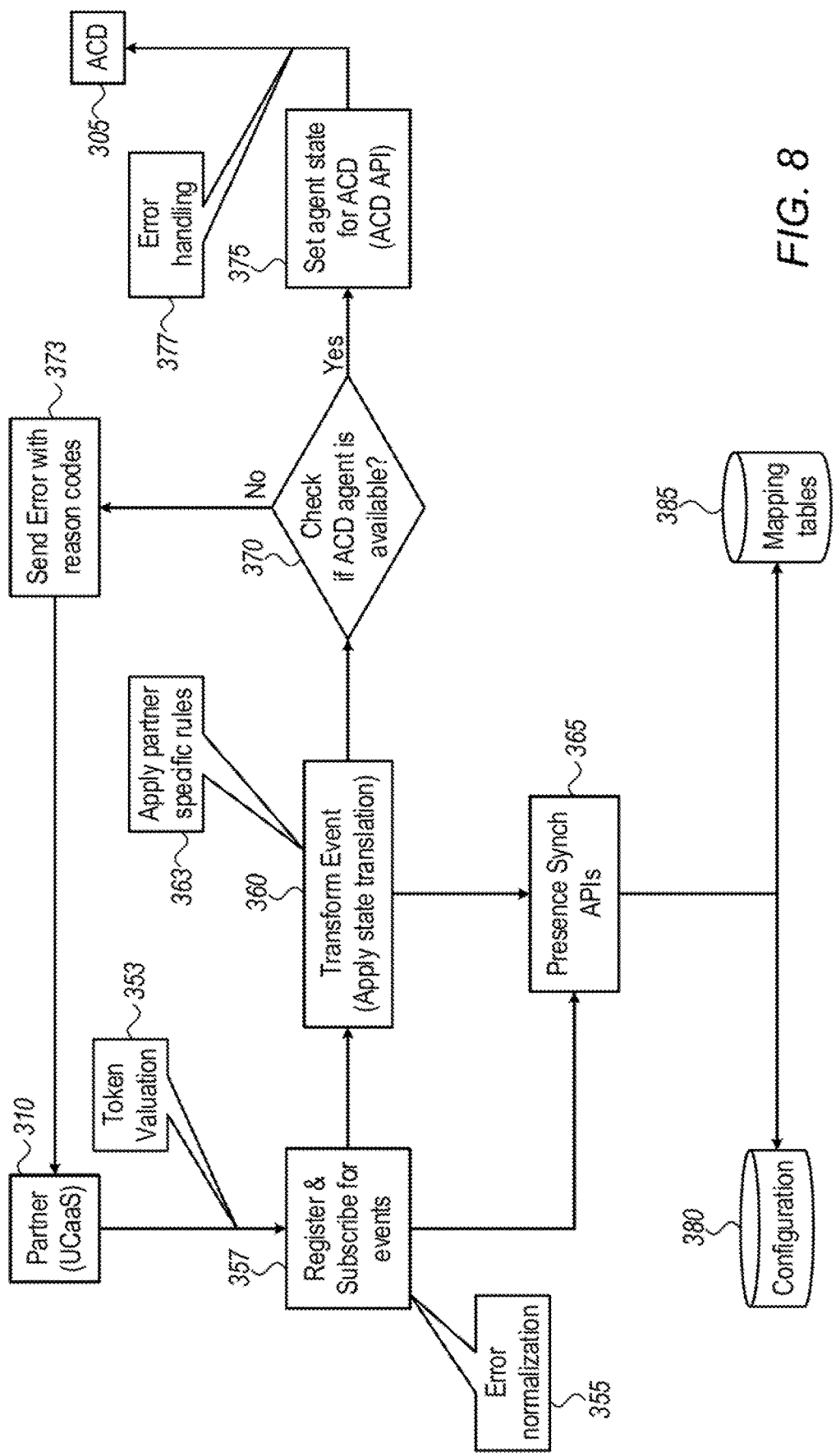
FIG. 8 is an algorithmic flow diagram for a subscriber microservice, in accordance with some embodiments of the present invention.

FIG. 8 is an algorithmic flow diagram 300 for subscriber 130 microservice, in accordance with some embodiments of the present invention. Subscriber 130 may register and subscribe for events 357 from a partner 310 platform using token valuation 353 and error normalization 355. The events may be transformed 360 by applying state translation and by applying 363 partner specific rules 363. Subscriber 130 may check if ACD agent is available in a decision step 370. If not, error may be sent to Partner 310 with reason codes. If the agent is available, Subscriber 130 may set 375 agent state on ACD 305 using error handling 377.

Subscriber 130 during registration 357 and subscription of events and/or transformation 360 of events may call Presence Synchronization APIs 365 which use mapping tables 385 and configuration 380 with partner specific configuration/authentication and token management. Mapping tables 335 may include, for example, state synchronization rules, user mappings, association of rules with partners, and flow of events.

In some embodiments of the present invention, Subscriber 130 may receive a stream of events from UCaaS 310. Instructions for processing the stream of events are listed below:

1. Subscriber 130 may register for specific type of events that indicate a change in agent state.
2. Agent and business unit ID (BUID) may be derived from the events.
3. Partner specific subscription may be validated for directionality from UCaaS 310 to ACD 305.
4. Agent specific details may be looked up in a mapping table to get mapping state synchronization rules and ACD identity.
5. State synchronization rules may be applied to transform agent state in a format for ACD 305.
6. Subscriber 130 may check if the agent is available for call on ACD 305. If not, PSA 195 may send an error message to UCaaS 310.
7. If yes agent is available, token management may look up ACD token and BUID. The same token may be used to set agent state on ACD 305 using APIs.
8. If agent state is not set in a first attempt, Subscriber 130 may attempt retries as configured.

Figure 9A:
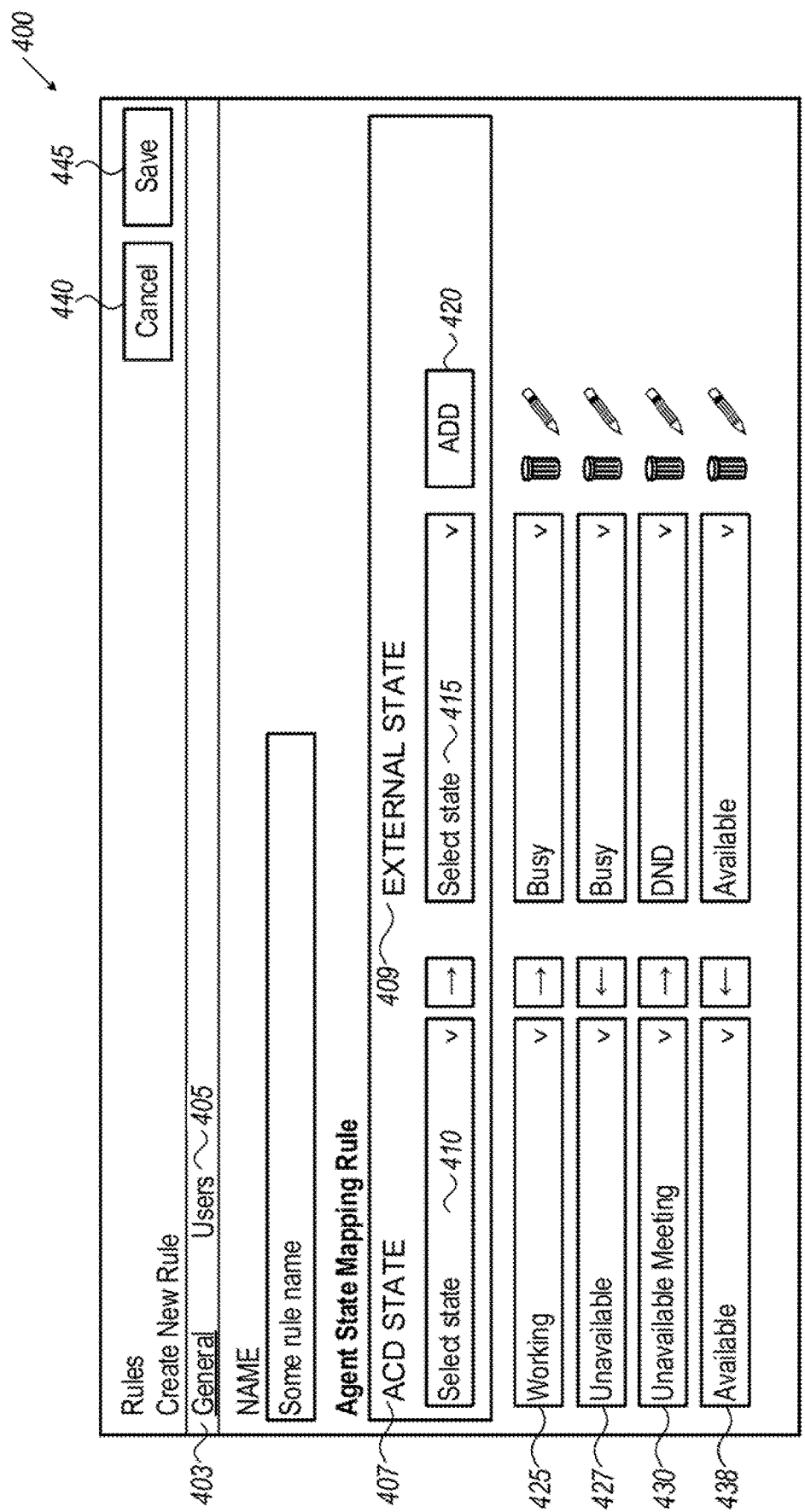
FIG. 9A is a first embodiment of a user interface for creating mapping rules, in accordance with some embodiments of the present invention.

FIG. 9A is a first embodiment of a user interface 400 for creating mapping rules, in accordance with some embodiments of the present invention. User interface 400 may include control links General 403 and Users 405. When general 403 link is clicked by the user, such as by using a mouse or any suitable pointing device (e.g., input device 80) for example, the window shown in FIG. 9A may be displayed to the user on a display. The user may add a Rule name and set mapping rules to map an ACD state 407 to an external state 409 (e.g., partner) using respective pull-down menus 410 and 415. By the user clicking on ADD button 420, the rules may be registered. When the user presses SAVE 445, the mapping rules may be saved under the assigned rule name given by the user. When the user presses CANCEL 440, the action is cancelled.

In some embodiments of the present invention, the registered rules as shown in FIG. 9A may include a first rule 425 where an agent with a working state on the ACD platform may be mapped to a Busy state on the External State (Partner side), a second rule 427 where an agent with an unavailable state on the ACD platform may be mapped to a Busy state on the External State (Partner side), a third rule 430 where an agent with an unavailable meeting state on the ACD platform may be mapped to a do not disturb (DND) state on the External State (Partner side), and a fourth rule 438 where an agent with an available state on the ACD platform may be mapped to an available state on the External State (Partner side).

Figure 9B:
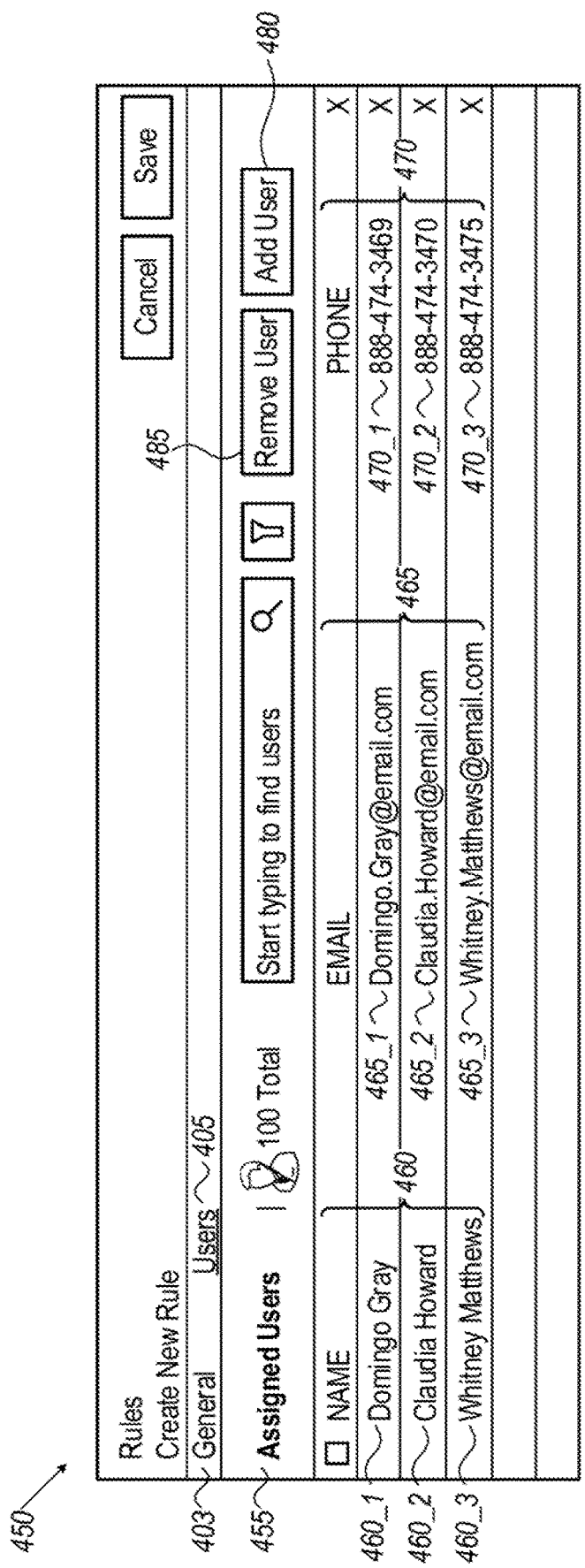
FIG. 9B is a second embodiment of a user interface for creating mapping rules, in accordance with some embodiments of the present invention.

FIG. 9B is a second embodiment of a user interlace 450 for creating mapping rules, in accordance with some embodiments of the present invention. User interface 450 may include control links General 403 and Users 405. When the users 405 link may be clicked by the user such as by using a mouse or any suitable pointing device (e.g., input device 80), for example, the window shown in FIG. 9B may be displayed to the user.

In some embodiments of the present invention, user interface 450 may include a menu for adding or removing assigned users 455 to the rule defined in user interface 400 in FIG. 9A. A name of the agent (e.g., user) may be typed into the "Start typing to find users" search field and search. When the desired name is found, the user of user interface 450 may click the buttons to REMOVE USER 485 or ADD USER 480 which adds or remove the desired user name from the list of names 460 with respective email addresses 465 and telephone numbers 470 as shown in FIG. 9B. (For example, Domingo Grey 460_1 with e-mail address 465_1: Domingo.Gray@email.com and phone number 470_1: 888-474-3769; Claudia Howard 460_2 with e-mail address 465_2: Claudia.Howard@email.com and phone number 470_2: 888-474-3470; and Whitney Matthews 460_3 with e-mail address 465_3: Whitney.Matthews@email.com and phone number 470_3: 888-474-3475.)

In some embodiments of the present invention, user interface 450 may include additional features for adding and % or removing a next availability state (not shown in FIGS. 9A-9B). User interface 450 may include additional features for adding and/or removing routing availability states (not shown in FIGS. 9A-9B).

Figure 10:
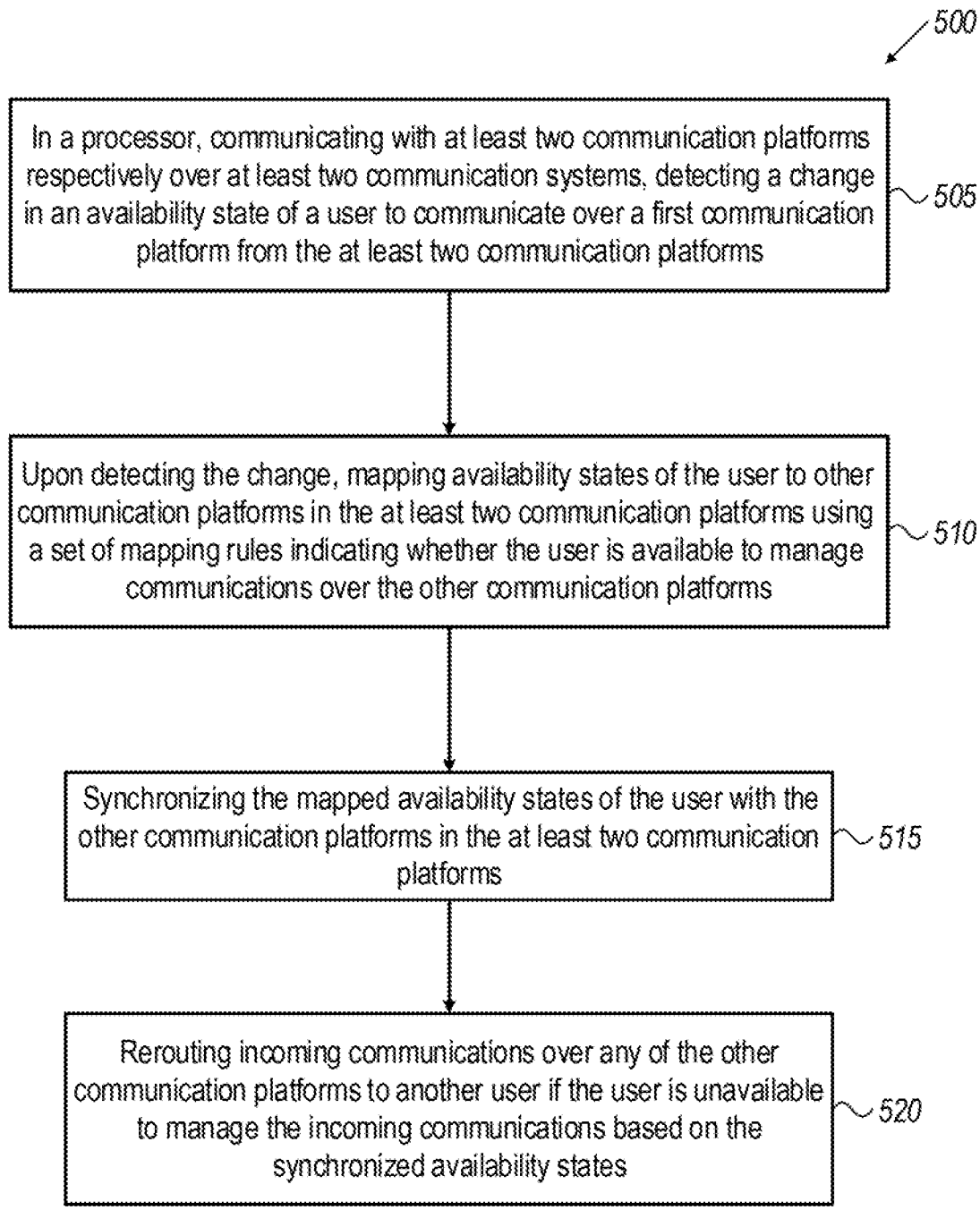
FIG. 10 is a flowchart depicting a method for managing availability states of a user to communicate over multiple communication platforms, in accordance with some embodiments of the present invention.

FIG. 10 is a flowchart depicting a method 500) for managing availability states of a user to communicate over multiple communication platforms, in accordance with some embodiments of the present invention. Method 500 may be executed by processor 65 of computerized system 60. Processor 65 may be configured to communicate with at least two communication platforms respectively over at least two communication systems.

Method 500 may include detecting 505 a change in an availability state of a user to communicate over a first communication platform from the at least two communication platforms.

Method 500 may include upon detecting the change, mapping 510 availability states of the user to other communication platforms in the at least two communication platforms using a set of mapping rules indicating whether the user is available to manage communications over the other communication platforms.

Method 500 may include synchronizing 515 the mapped availability states of the user with the other communication platforms in the at least two communication platforms.

Method 500 may include rerouting 520 incoming communications over any of the other communication platforms to another user if the user is unavailable to manage the incoming communications based on the synchronized availability states.

In some embodiments of the present disclosure, a computerized method for managing availability states of a user to communicate over multiple communication platforms may include a processor of a computerized system communicating with at least two communication platforms respectively operating on at least two communication systems. The processor may be configured to execute a code with instructions for:

detecting a change in an availability state of a user to communicate over a first communication platform from the at least two communication platforms;

upon detecting the change, mapping availability states of the user to other communication platforms in the at least two communication platforms using a set of mapping rules indicating whether the user is available to manage communications over the other communication platforms;

synchronizing the mapped availability states of the user with the other communication platforms in the at least two communication platforms; and rerouting incoming communications over any of the other communication platforms to another user if the user is unavailable to manage the incoming communications based on the synchronized availability states.

In some embodiments of the present disclosure, at least one rule in the set of mapping rules may include a next availability state, and the method may include automatically applying the at least one rule with the next availability state to the at least two communication platforms.

In some embodiments of the present disclosure, detecting the change may include receiving or ending a communication by the user on the first communication platform.

In some embodiments of the present disclosure, detecting the change may include changing the availability state to available or unavailable by the user on the first communication platform.

In some embodiments of the present disclosure, the method may include outputting the mapping of the availability states on a display.

In some embodiments of the present disclosure, the at least two communication platforms may include an automatic call distribution (ACD) platform and a Unified Communication as a Service (UCaaS).

In some embodiments of the present disclosure, the availability states may be selected from the group consisting of offline, unavailable, unavailable meeting unavailable lunch, busy, after call work (ACW), out of office, working, away, do not disturb (DND), messages only, available, and online.

In some embodiments of the present disclosure, the set of mapping rules may include rules for routing communications to other users or to communication platforms used by the other users.

In some embodiments of the present disclosure, the set of mapping rules may be specific to the user, a group of users, or the at least two communication systems.

In some embodiments of the present disclosure, the method may include receiving the set of mapping rules created by the user.

In some embodiments of the present disclosure, the method may include creating the set of mapping rules dynamically.

In some embodiments of the present disclosure, a computerized system for managing availability states of a user to communicate over multiple communication platforms may include a communication interface and a processor. The processor may communicate via the communication interface with at least two communication platforms respectively over at least two communication systems, and may be configured to execute a code with instructions for:

detecting a change in an availability state of a user to communicate over a first communication platform from the at least two communication platforms;

upon detecting the change, mapping availability states of the user to other communication platforms in the at least two communication platforms using a set of mapping rules indicating whether the user is available to manage communications over the other communication platforms;

synchronizing the mapped availability states of the user with the other communication platforms in the at least two communication platforms; and rerouting incoming communications over any of the other communication platforms to another user if the user is unavailable to manage the incoming communications based on the synchronized availability states.

In some embodiments of the present disclosure, at least one rule in the set of mapping rules may include a next availability state, and the processor may be configured to execute a code with instructions for automatically applying the at least one rule with the next availability state to the at least two communication platforms.

In some embodiments of the present disclosure, the processor may be configured to execute a code with instructions for detecting the change by receiving or ending a communication by the user on the first communication platform.

In some embodiments of the present disclosure, the processor may be configured to execute a code with instructions for detecting the change by the user changing the availability state to available or unavailable on the first communication platform.

In some embodiments of the present disclosure, the system may include a display, and the processor may be configured to execute a code with instructions for outputting the mapping of the availability states on the display.

In some embodiments of the present disclosure, the at least two communication platforms may include an automatic call distribution (ACD) platform and a Unified Communication as a Service (UCaaS).

In some embodiments of the present disclosure, the availability states may be selected from the group consisting of offline, unavailable, unavailable meeting, unavailable lunch, busy, after call work (ACW), out of office, working, away, do not disturb (DND), messages only, available, and online.

In some embodiments of the present disclosure, the set of mapping rules may include rules for routing communications to other users or to communication platforms used by the other users.

In some embodiments of the present disclosure, the set of mapping rules may be specific to the user, a group of users, or the at least two communication systems.

In some embodiments of the present disclosure, the processor may be configured to execute a code with instructions for receiving the set of mapping rules created by the user.

In some embodiments of the present disclosure, the processor may be configured to execute a code with instructions for creating the set of mapping rules dynamically.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A computerized method for synchronizing availability states of between two or more different communication platforms, without any modifications thereof, for the agent to communicate over multiple communication platforms, the method comprising:
  in a processor of a computerized system communicating with at least two different communication platforms respectively operating on at least two different communication systems,
  wherein the at least two communication Platforms comprise an automatic call distribution (ACD) platform and a Unified Communication as a Service (UCaaS),
  operating a Presence Synchronization Application (PSA), said PSA is configured to execute a code with instructions for:
  detecting a change in an availability state of an agent to communicate over a first
  communication platform with a first user from the at least two different communication platforms;
  upon detecting the change, mapping availability states of the agent to other different communication platforms in the at least two different communication platforms using a set of mapping rules indicating whether the agent is available to manage communications with a second user over the other different communication platforms, wherein the set of mapping rules is specific to: the agent, a group of agents, or the at least two different communication systems;
  synchronizing the mapped availability states of the agent with the other different communication platforms in the at least two different communication platforms; and
  rerouting incoming communications with the second user over any of the other different communication platforms to another agent if the agent is unavailable to manage the incoming communications with the second user based on the synchronized availability states.

2. The method according to claim 1, wherein at least one rule in the set of mapping rules comprises a next availability state, and further comprising automatically applying the at least one rule with the next availability state to the at least two communication platforms.

3. The method according to claim 1, wherein detecting the change comprises receiving or ending a communication by the user on the first communication platform.

4. The method according to claim 1, wherein detecting the change comprises changing the availability state to available or unavailable by the user on the first communication platform.

5. The method according to claim 1, further comprising outputting the mapping of the availability states on a display.

6. The method according to claim 1, wherein the availability states are selected from the group consisting of offline, unavailable, unavailable meeting, unavailable lunch, busy, after call work (ACW), out of office, working, away, do not disturb (DND), messages only, available, and online.

7. The method according to claim 1, wherein the set of mapping rules comprises rules for routing communications to other users or to communication platforms used by the other users.

8. The method according to claim 1, further comprising receiving the set of mapping rules created by the user.

9. The method according to claim 1, further comprising creating the set of mapping rules dynamically.

10. A computerized system for synchronizing availability states of an agent between two or more different communication platforms without any modifications thereof for the agent to communicate over multiple different communication platforms, the system comprising:
  a communication interface; and
  a processor, communicating via the communication interface with at least two
  different communication platforms respectively over at least two different communication systems,
  wherein the at least two communication platforms comprise an automatic call distribution (ACD) platform and a Unified Communication as a Service (UCaaS), and
  a Presence Synchronization Application (PSA), said PSA is configured to execute a code with instructions for:
  detecting a change in an availability state of an agent to communicate over a first
  communication platform with a first user from the at least two different communication platforms;
  upon detecting the change, mapping availability states of the agent to other different communication platforms in the at least two different communication platforms using a set of mapping rules indicating whether the agent is available to manage communications with a second user over the other different communication platforms, wherein the set of mapping rules is specific to: the agent, a group of agents, or the at least two different communication systems;
  synchronizing the mapped availability states of the agent with the other different communication platforms in the at least two different communication platforms; and
  rerouting incoming communications with the second user over any of the other different communication platforms to another agent if the agent is unavailable to manage the incoming communications with the second user based on the synchronized availability states.

11. The system according to claim 10, wherein at least one rule in the set of mapping rules comprises a next availability state, and wherein the processor is configured to execute a code with instructions for automatically applying the at least one rule with the next availability state to the at least two communication platforms.

12. The system according to claim 10, wherein the processor is configured to execute a code with instructions for detecting the change by receiving or ending a communication by the user on the first communication platform.

13. The system according to claim 10, wherein the processor is configured to execute a code with instructions for detecting the change by the user changing the availability state to available or unavailable on the first communication platform.

14. The system according to claim 10, further comprising a display, and wherein the processor is configured to execute a code with instructions for outputting the mapping of the availability states on the display.

15. The system according to claim 10, wherein the availability states are selected from the group consisting of offline, unavailable, unavailable meeting, unavailable lunch, busy, after call work (ACW), out of office, working, away, do not disturb (DND), messages only, available, and online.

16. The system according to claim 10, wherein the set of mapping rules comprise rules for routing communications to other users or to communication platforms used by the other users.

17. The system according to claim 10, wherein the processor is configured to execute a code with instructions for receiving the set of mapping rules created by the user.

18. The system according to claim 10, wherein the processor is configured to execute a code with instructions for creating the set of mapping rules dynamically.

19. The method according to claim 1, wherein the detecting of the change in the availability state of the user to communicate over the first communication platform, is performed by a subscriber microservice which has registered and subscribed for events from a second communication platform, using token valuation and error normalization and wherein the events are transformed by applying state translation and by applying the second communication platform specific rules.

20. The method according to claim 19, wherein the subscriber microservice is checking if the user of the first communication platform is available and if the user is not available then an error is sent to the second communication platform with reason codes and if the user of the first communication platform is available then the subscriber microservice sets the availability state of the user of the first communication platform state using error handling.

21. The method according to claim 20, wherein the subscriber microservice during registration and subscription of events and/or transformation of events calls a Presence Synchronization API which uses mapping tables and configuration with the second communication platform specific configuration or authentication and token management, and wherein the mapping tables include at least one of: state synchronization rules, user mappings, association of rules with partners, and flow of events.

22. The method according to claim 21, wherein the subscriber microservice checks if the user of the first communication platform is available for call on the first communication platform and if the user is not available a Presence Synchronization Application (PSA) sends an error message to the second communication platform and wherein if the user is available, token management looks up the first communication platform token and Business Unit ID (BUID).

23. The method according to claim 8, wherein the set of mapping rules created by the user is received by a user interface, wherein the user is enabled to add a Rule name and set mapping rules to map a first communication platform state to a second communication platform state.

* * * * *